(12) United States Patent
Takayanagi et al.

(10) Patent No.: US 7,629,058 B2
(45) Date of Patent: Dec. 8, 2009

(54) SLIDING MEMBER

(75) Inventors: Satoshi Takayanagi, Inuyama (JP); Toshiaki Kawachi, Inuyama (JP); Masahito Fujita, Inuyama (JP)

(73) Assignee: Daido Metal Company, Ltd., Nagoya (JP)

( * ) Notice: Subject to any disclaimer, the term of this patent is extended or adjusted under 35 U.S.C. 154(b) by 793 days.

(21) Appl. No.: 11/386,617

(22) Filed: Mar. 23, 2006

(65) Prior Publication Data
US 2006/0216539 A1    Sep. 28, 2006

(30) Foreign Application Priority Data
Mar. 25, 2005  (JP) ............... 2005-088508

(51) Int. Cl.
*F16C 33/12*  (2006.01)
*B32B 15/01*  (2006.01)

(52) U.S. Cl. .................. 428/642; 384/42; 384/912

(58) Field of Classification Search ............ None
See application file for complete search history.

(56) References Cited

U.S. PATENT DOCUMENTS 5,045,405 A    9/1991  Koroschetz et al.
6,863,441 B2 *  3/2005  Kawachi et al. ............. 384/276
6,997,612 B2 *  2/2006  Kawachi et al. ............... 384/42
7,063,897 B2 *  6/2006  Kawachi et al. ............. 428/642
7,128,981 B2 * 10/2006  Kawachi et al. ............. 428/642

FOREIGN PATENT DOCUMENTS

| JP | 11-50296 A     |   | 2/1999  |
| JP | 2003-156045 A  |   | 5/2003  |
| JP | 2004-308883 A  |   | 11/2003 |
| JP | 2005-097704    | * | 4/2005  |

* cited by examiner

*Primary Examiner*—John J Zimmerman
(74) *Attorney, Agent, or Firm*—Browdy and Neimark, P.L.L.C.

(57) ABSTRACT

A sliding member has a coating layer deposited on a base material through an intermediate layer, wherein the intermediate layer is formed of a lead-free metal, and the coating layer is formed of Bi or a lead-free Bi alloy; and wherein a grain in the intermediate layer becomes gradually large toward a coating layer side from a base material side, and a grain in the coating layer forms a columnar grain of which the major axis directs toward the surface of the coating layer from the intermediate layer side. Thus formed configuration improves a bonding strength between the base material and the coating layer owing to the intermediate layer, and has the grain of the coating layer formed into a desirable shape for bearing a load from an opposite material to improve fatigue resistance.

20 Claims, 3 Drawing Sheets

SLIDING MEMBER

TECHNICAL FIELD

The present invention relates to a sliding member having a coating layer deposited on a base material through an intermediate layer, and particularly relates to the sliding member comprising the coating layer composed of Bi (bismuth) or a Bi alloy.

BACKGROUND OF THE INVENTION

As a sliding member such as a plain bearing used in a crankshaft or a connecting rod of an automotive engine, a bearing is often used which includes a bearing alloy of a Cu (copper) alloy or an Al (aluminum) alloy lined on the surface of a back steel. The bearing has a coating layer deposited on the surface of the bearing alloy (base material) through an intermediate layer by electroplating. The coating layer is provided for the purpose of further improving bearing characteristics such as conformability with an opposite material, and the intermediate layer is provided for improving a bonding strength between the bearing alloy and the coating layer.

Conventionally, an alloy containing Pb (lead) and Sn (tin) as main components has been used as a metal composing the coating layer. Among them, Pb (lead) is an environmental contamination substance, so that a Pb-free material has been pursued. It is proposed to use Bi as its substitute material, which has a low-melting point similar to Pb. However, Bi in its natural state cannot be used as a material for forming a coating layer to which fatigue resistance and conformability are required, because it is hard and fragile. In order to improve the properties of hardness and fragility of Bi, various kinds of improvements have been made (for instance, see JP-A-11-50296, JP-A-2003-156045, or JP-A-2004-308883.

SUMMARY OF THE INVENTION

In a recent automotive engine, power has been further increased, and high fatigue resistance has been required to a bearing. However, in JP-A-11-50296 a metallographic structure of a coating layer and an intermediate layer are not considered. It does not closely examine a material to be used in the intermediate layer, so that some materials employed therein may form a fragile intermetallic compound with Bi of the coating layer. When the fragile intermetallic compound is formed between the intermediate layer and the coating layer, it deteriorates a bonding strength of the coating layer, and consequently deteriorates fatigue resistance. In addition, a low-melting compound may be formed in the coating layer. In such a case, an anti-seizure property is also deteriorated.

The present invention has been made to solve the problems, and its object is to improve a bonding strength of a coating layer and consequently improve fatigue resistance, in a sliding member having the coating layer made of Bi or a Bi alloy deposited on a base material through an intermediate layer.

A summary of the present invention is described below.

First, the present invention is designed to improve fatigue resistance by improving a bonding strength of a coating layer to a base material and controlling a grain shape of a coating layer. The bonding strength is achieved by controlling a grain size of an intermediate layer, and simultaneously a grain growth of the coating layer is controlled so as to form the grain in the coating layer into a shape suitable for bearing a load, that is a columnar grain which is elongated in a thickness direction of the coating layer.

Second, the present invention is designed to control a crystalline orientation of Bi and a Bi alloy in an overlay layer for improving an anti-seizure property and conformability concurrently with improving the fatigue resistance.

DETAILED DESCRIPTION OF THE INVENTION (1) Fatigue Resistance

The present invention provides a sliding member configured to have a coating layer with a sliding surface deposited on a base material through an intermediate layer, in order to improve the fatigue resistance, wherein the intermediate layer is formed of a lead-free metal and the coating layer is formed of Bi or a lead-free Bi alloy, and wherein the grain of the intermediate layer becomes gradually large toward the coating layer side from the base material side and the grain in the coating layer forms the columnar grain which is elongated along a thickness direction of the coating layer.

The configuration will be described below.

<Grain of Intermediate Layer>

In order to improve fatigue resistance of a coating layer, at first, the coating layer must have high bonding strength to a base material and hardly break away from the base material.

An electroplating method and a PVD (Physical Vapor Deposition) method are generally known as a metal-depositing method capable of providing high bonding strength, and these methods are used for depositing the coating layer on a plain bearing of an automotive engine.

Generally, when depositing a metallic layer by an electroplating method or a PVD method, a grain size of a deposited metal, or particularly, a grain diameter in a imaginary plane parallel to the deposition interface (generally, a plane parallel to a sliding surface) is preferably nearly equal to that of a metal of a substrate. When there is a large difference between both grain sizes, the bonding strength of the metallic layer can not be improved.

However, in a sliding member such as a plain bearing of an automotive engine, the grain of the bearing alloy layer is refined, because the bearing alloy layer is surface-finished in a boring process or the like before a coating layer is deposited, and has great strain caused by the working generated on its surface. On the other hand, Bi that is used as a material for the coating layer in the present invention deposits in a form of a large grain, which is peculiar to a low-melting metal. For this reason, it is difficult to control the coating layer formed of Bi or a Bi alloy so as to have the nearly equal grain size as the surface of the bearing alloy.

In addition, Bi has a trigonal crystal structure, which is different from that of the bearing alloy such as a Cu alloy and an Al alloy used as the base material of the plain bearing of the automotive engine, so that even if such Bi is directly coated on the bearing alloy layer with an electroplating method or a PVD method, the coating layer can not obtain high bonding strength and high fatigue resistance.

Figure 1:
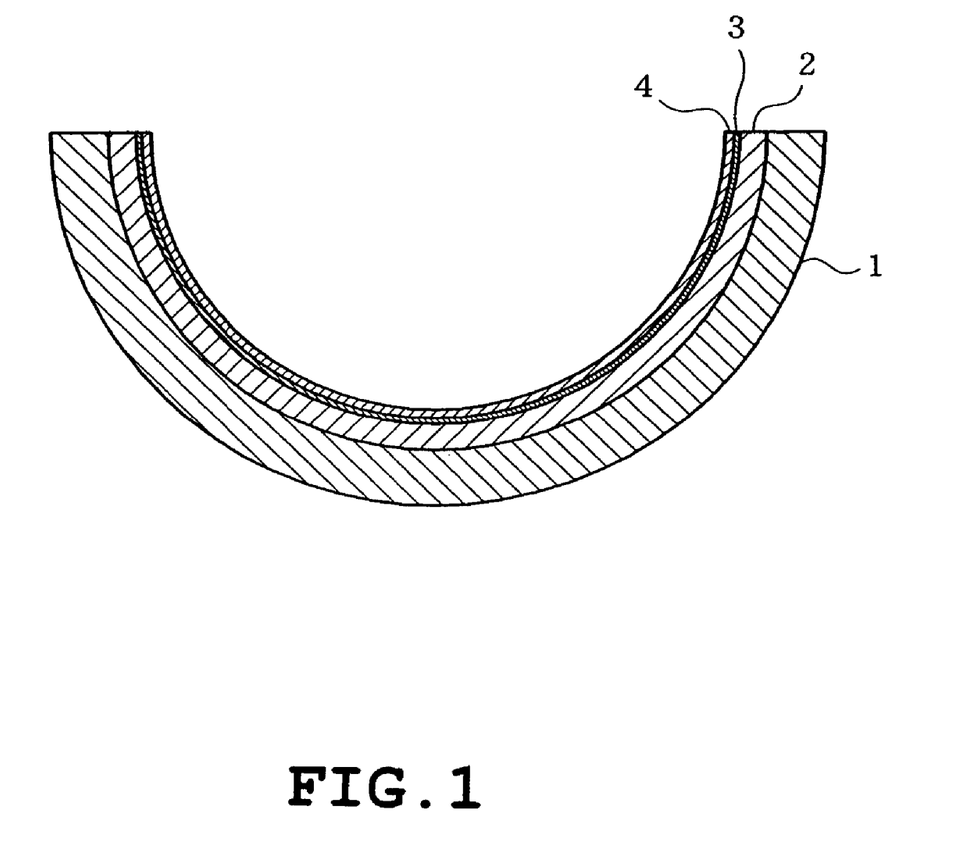
FIG. 1 is a sectional view of a half bearing showing an embodiment of the present invention.
Figure 2:
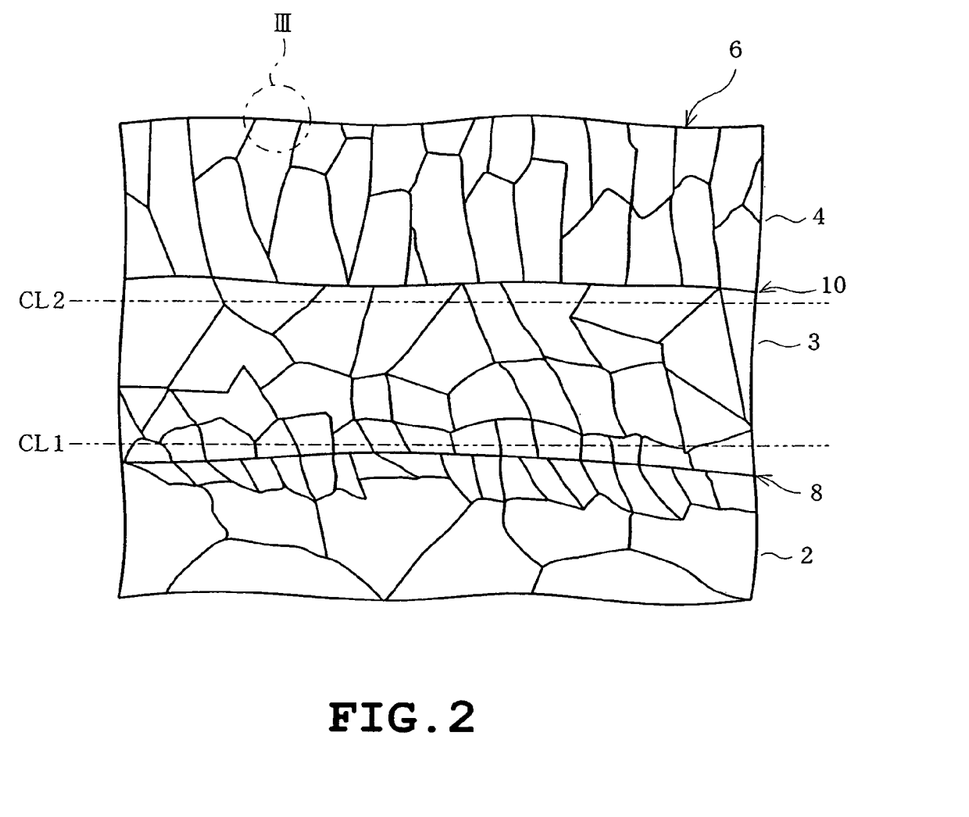
FIG. 2 is a schematic view showing a metallographic structure in each layer.

For this reason, in a sliding member according to the present invention, an intermediate layer is arranged between a base material and a coating layer, a grain size of which becomes large toward a coating layer side from a base material side. A plain bearing of an automotive engine, for instance, has a structure as shown in FIG. 1, which comprises a bearing alloy layer 2 made of a Cu alloy or an Al alloy lined on a back steel 1, and the coating layer 4 deposited on the surface of the bearing alloy layer 2 through the intermediate layer 3. When the present invention is applied to such a plain bearing, the grain of the intermediate layer 3 becomes small in the bearing alloy layer side, in other words, in the base material 2 side, and gradually become larger in the coating layer 4 side, as is shown in FIG. 2. Thereby, the grain size of the intermediate layer 3 in the vicinity of an interface 8 with the base material 2 is not much different from that of the base material 2 in the vicinity of the interface 8 with the intermediate layer 3, and at the same time, the grain size of the intermediate layer 3 in the vicinity of an interface 10 with the coating layer 4 is not much different from those of the coating layer 4 in the vicinity of the interface 10 with the intermediate layer 3, which increase the bonding strength of the intermediate layer 3 to the base material 2, and also increase the bonding strength of the coating layer 4 to the intermediate layer 3.

Accordingly, the intermediate layer 3 hardly breaks away from the base material 2, and the coating layer 4 hardly breaks away from the intermediate layer 3. Consequently the fatigue resistance of the whole layer of the intermediate layer 3 and the coating layer 4 is improved. In the following description, the whole layer containing the intermediate layer and the coating layer will be referred as an overlay.

As described above, a grain size affects bonding strength between a base material 2 and an intermediate layer 3 and between an intermediate layer 3 and a coating layer 4. Then, the grain in the intermediate layer 3 in the vicinity of an interface with the coating layer 4 has a diameter in a imaginary plane parallel to a sliding surface 6 being preferably not less than twice by average than that in the intermediate layer 3 in a imaginary plane parallel to a sliding surface 6 in the vicinity of an interface with the base material 2.

When the grain diameter of the intermediate layer 3 in the coating layer 4 side is controlled to be different from that in the base material 2 side to the above extent, the grain sizes become more continuous between the base material 2 and the intermediate layer 3 and between the intermediate layer 3 and the coating layer 4, which more improves each interlayer (in interfaces) bonding strength, and consequently improves fatigue resistance of an overlay.

However, even if the diameter of the grain of an intermediate layer 3 in the coating layer 4 side would be thus controlled so as to be less different from that of the large grain of the coating layer 4, when a metal composing the intermediate layer 3 and a metal composing the coating layer 4 form an intermetallic compound, the coating layer 4 tends to break away from the intermediate layer 3 because the intermetallic compound is fragile, which lowers the fatigue resistance of an overlay. For this reason, the intermediate layer is preferably made of such a metal as not to produce the intermetallic compound with Bi, for instance, a single element metal of Ag (silver), Cu (copper) and Co (cobalt).

When using a Bi alloy for the coating layer, a combination should be selected so that an additive element may not produce the intermetallic compound with the metal of the intermediate layer. Ag and Cu have remarkably high thermal conductivity and a particularly superior nature of diffusing heat produced in a sliding surface to a base material. Co has high corrosion resistance.

<Grain of Coating Layer>

A load of an opposite material is vertically applied onto a sliding surface of a coating layer in a sliding member, and the load causes fatigue failure in the coating layer.

Accordingly, the coating layer in the present invention is made to have a columnar grain which extends from an intermediate layer side to the surface side of the coating layer, so that the coating layer can bear a large load without causing the fatigue failure therein.

In the present invention, a columnar grain means a cellular crystal grain growing in an approximately vertical direction from the surface side of an intermediate layer. When a crystal in a coating layer is columnar and the growing direction thereof (major axis direction) approximately matches with the direction toward the surface of the coating layer from the intermediate layer (thickness direction of coating layer), the generally trunk-shaped crystal plays a role of bearing a load of an opposite material in a longitudinal direction (which means that the grain bears the load of the opposite material in a major axis direction), so that the coating layer has superior strength and fatigue resistance.

Figure 3:
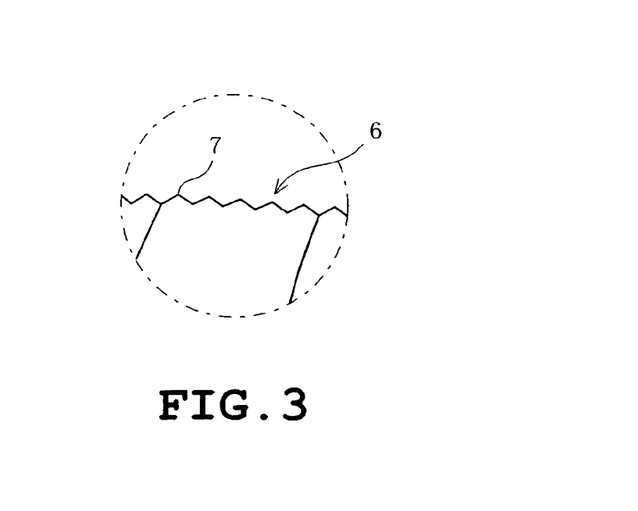
FIG. 3 is an enlarged view of a region III in FIG. 2.

The columnar grain is roughly rectangular, which causes a concept of a longitudinal direction and a transverse direction. As shown in FIG. 3, when a straight line is drawn so as to match the longest part of the columnar grain, the straight line is determined to be a major axis. A straight line perpendicular to the major axis at the midpoint of the major axis is determined to be a minor axis. A ratio (A/B) of a length A of the major axis to a length B of the minor axis is referred to an aspect ratio. This will be described later further in detail.

A grain of a coating layer preferably forms a columnar grain having an angle between a major axis and a thickness direction of the coating layer of not more than 20 degrees by average, and having an aspect ratio of the major axis to the minor axis of the grain of not less than 2 but not less than 10.

When the angle between the major axis and the thickness direction of the coating layer is not more than 20 degrees, even if the major axis is not always perpendicular to the surface of a coating layer, the grain bears a load of the opposite material in the major axis direction, which improves fatigue resistance.

When the grain has an aspect ratio of not less than 2, the grain is sufficiently grown as a columnar grain and can bear a greater vertical load in a major axis direction. When the columnar grain has an aspect ratio of not more than 10, the columnar grain receives little effect of a vertical component of frictional force generated between the bearing and the opposite material, at its long-growing side face, so that fatigue failure hardly occurs in grain boundaries. Accordingly, the aspect ratio is preferably not less than 2 but not more than 10.

JP-A-11-50296 allows a material of a coating layer to be an alloy of Bi added with Ag. However, Ag forms a separated phase from Bi, and exists in a grain boundary of Bi, so that it refines the grain of Bi. As a result, the grain of Bi hardly grows into a columnar grain.

JP-A-2003-156045 proposes to improve fatigue resistance through improving the fragility of Bi by controlling the density of depositing Bi particles in a coating layer. The coating layer in the Patent Document has improved wear resistance and fragility, because the Bi grain is comparatively refined. However, a sliding member having the Bi of the columnar grain as in the present invention can obtain higher fatigue resistance. In addition, JP-A-2004-308883 proposes to improve a fatigue resistance and an anti-seizure property by controlling a crystal orientation of Bi in the coating layer, but even though the method disclosed in the Patent Document would control the crystal orientation, the Bi crystal is not grown into the columnar grain.

<Method of Observing Grain>

In order to calculate a grain size and an aspect ratio as described above, it is necessary to observe the grain and measure a grain diameter of a major axis and a minor axis. Methods for observing them in this case will be now described below. Here, the case will be described where an observed visual field is 5 μm×5 μm and measurement magnification is not less than 25,000 times.

(a) Observation for Grain in Vertical Cross-sectional Structure of Sliding Member A vertical cross section means the cross section of an intermediate layer and a coating layer cut along the thickness direction. The vertical cross-sectional of grains is observed by using a transmission electron microscope, a scanning electron microscope, a FIB/SIM (Focus Ion Beam/scanning ion microscope), an EBSP (electron backscattering pattern) method, or other techniques capable of observing the grain. FIG. 2 shows a schematic image of the grains in the vertical cross section.

(b) Measurement of Grain Diameter in Plane Parallel to Surface of Coating Layer

The diameter of the grain is determined by observing the grain with the above described method, drawing a line of a predetermined length at a position of 50 nm above the top surface of the base material 2 (line CL 1) in the image as shown in FIG. 2, and calculating it from the number of grains with which the line crosses. This is the grain diameter in the plane parallel to the surface of the coating layer in the intermediate layer of a base material side.

In addition, the diameter of the grain is determined by drawing a line of a predetermined length at a position of 200 nm below the bottom surface of the coating layer 4 (line CL 2) similarly as shown in FIG. 2, and calculating it from the number of grains with which the line crosses. This is the grain diameter in the plane parallel to the surface of the coating layer in the intermediate layer of a coating layer side.

A top surface of the intermediate layer 3 and a bottom surface of the coating layer 4 actually have waviness, so that an imaginary plane having an average level of the swelled plane is respectively referred to a top surface and a bottom surface.

Some grains may include twin crystals. The twin crystals include crystals having the same lattice structure but are mirror symmetric with each other on a particular definite plane of a border. The crystals forming the twin crystals is considered to be one large grain, as is defined in JIS-H500. (In FIG. 2, a boundary line of the twin crystal is omitted).

(c) Aspect Ratio of Columnar Grain

Figure 4:
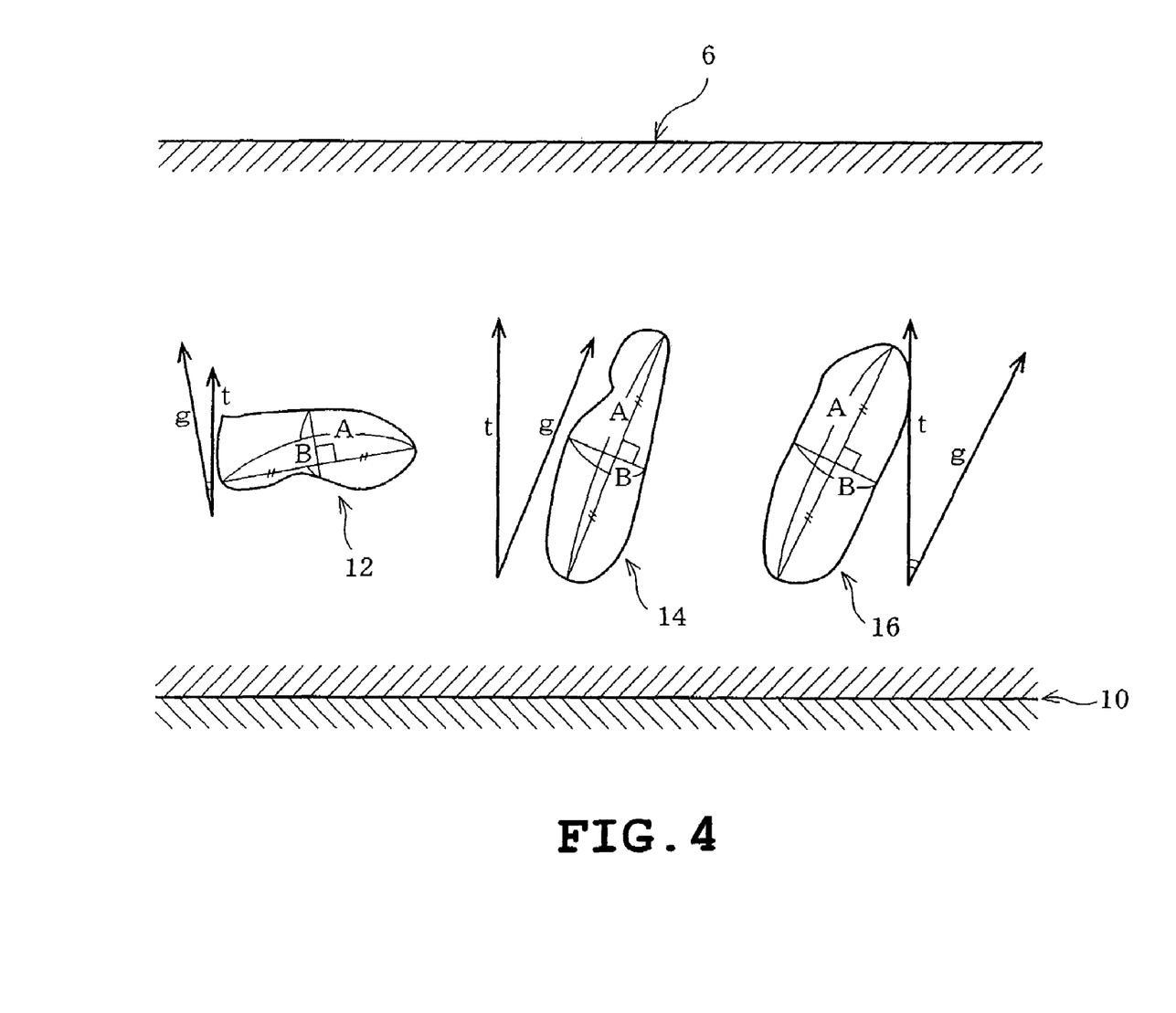
FIG. 4 is a schematic view showing a grain of a coating layer.

By observing the grain with the above described method, an axis matching a long part in the grain as shown in FIG. 4 is regarded as a major axis of the grain, and a straight line drawn so as to be vertical to the major axis at a midpoint of the major axis is determined to be a minor axis. Then, the lengths of the major axis and minor axis of the grain are measured. Either one axis of the major axis and the minor axis, which is within a range of 45 degrees in the left and right with respect to a thickness direction "t" of a coating layer, is determined to be the growing direction "g" of the columnar grain. In FIG. 4, the major axis is the growth direction "g" of the columnar grains of reference numerals 14 and 16, and the minor axis is the growth direction "g" of the columnar grain of reference numeral 12.

An aspect ratio is calculated according to the equation of aspect ratio=major axis length ($A$)/minor axis ($B$), when the growth direction "g" of the columnar grain is the major axis direction as shown by reference numerals 14 and 16 in FIG. 4, and is calculated according to the equation of aspect ratio=minor axis length ($B$)/major axis length ($A$), when the growth direction "g" of the columnar grain is the minor axis direction as shown by reference numeral 12 in FIG. 4.

<Other Means for Improving Fatigue Resistance>

Bonding strength between the base material and the intermediate layer and between the intermediate layer and the coating layer can be further strengthened by employing means described below.

(a) Thickness of Intermediate Layer and Coating Layer

A thickness of the intermediate layer affects a grain growth having continuity from a base material side to a coating layer side. When the intermediate layer has a thickness of not less than 1 μm, the grain of the intermediate layer sufficiently grows in a grain size having adequate continuity with the coating layer, and tends to have sufficient fatigue resistance. On the other hand, when the intermediate layer has a thickness of not more than 10 μm, a sliding member develops well-balanced total bearing characteristics.

A thickness of the coating layer also affects a growth of a grain in the coating layer into a columnar grain. When the coating layer has a thickness of not less than 2 μm, the grain in the coating layer easily grows in the columnar grain to improve fatigue resistance. On the other hand, when the coating layer has a thickness of not more than 15 μm, the grain easily grows to a columnar grain having an appropriate aspect ratio, which improves the fatigue resistance. In view of the above, the intermediate layer preferably has a thickness of 1 to 10 μm, and the coating layer preferably has a thickness of 2 to 15 μm.

(b) Inhibition of Alloying in Intermediate Layer and Coating Layer

Generally, an alloy has a lower melting point than a single elemental metal. An intermediate layer and coating layer of a sliding member have a superior anti-seizure property and fatigue resistance when they are formed of a metal having a high melting point. It is because when the surface temperature of the sliding member reaches the melting point of the overlay due to frictional heat with an opposite material, the overlay causes seizure, and it lowers its material strength and decreases its fatigue resistance as the surface temperature approaches the melting point. For this reason, it is preferable that the intermediate layer and the coating layer are formed of a single element metal for avoiding the lowering of the melting point of the overlay, in order to improve an anti-seizure property and fatigue resistance of the overlay.

In relation to this, a coating layer disclosed in JP-A-11-50296 hardly provides a sliding member superior in fatigue resistance, because it includes Sn (tin) and In (indium) added to Bi, which lowers the melting point of the coating layer and weaken it at a thermal load. The coating layer also tends to cause adhesion to an opposite material, because a fine eutectic phase with a low melting point formed in the coating layer melts, and as a result, hardly provides a high anti-seizure property. According to a phase diagram, when not less than 0.2 mass % of Sn is added to Bi, a eutectic phase appears with a remarkably low melting point (melting point of 139° C.)

(c) Matching of Crystal Structures Between Base Material and Intermediate Layer

A portion which is most likely to have weak bonding strength is a boundary between the base material and the intermediate layer. It is because the intermediate layer and the coating layer are serially formed with the same production method in general, and accordingly tend to be combined with each other through metallic bond and have a superior bonding strength. However, a bearing alloy in a plain bearing used as a base material is manufactured through casting and sintering, and is further machined, so that the surface thereof is stained and oxidized. When the intermediate layer is deposited on the bearing alloy layer with an electroplating method or a PVD method, the surface of the bearing alloy layer is cleaned and reduced, but the cleaning and the reduction may be insufficient. In this manner, when the intermediate layer is deposited on the base material, there are many factors of hindering a bonding strength between them, and the intermediate layer can not be always deposited with sufficient bonding strength.

In order to improve bonding strength between the base material and the intermediate layer, a metal forming the intermediate layer is selected so that the matrix metal of the base material and the matrix metal of the intermediate layer can have the same crystal structure. For instance, because a plain bearing of an automotive engine employs a bearing alloy of a Cu alloy or an Al alloy as a base material, the metal, for instance Ag having face-centered cubic structure, is used which has the same crystal structure as Cu having face-centered cubic structure or Al having face-centered cubic structure, which is matrix metal of the bearing alloy. This is because, when the metals have the same crystal structure whether they are of the same element or different elements, the atoms therein are in high continuity, and the intermediate layer can obtain high bonding strength to the base material in the interface.

(2) Improvement of Anti-seizure Property

The present inventors have found a Bi-based material which is superior in an anti-seizure property, and measured its crystal orientation in terms of X-ray diffracted intensity. As a result, it was elucidated that a material with particularly superior anti-seizure property includes a Miller index (202) face in an amount of not less than 30% by an index of orientation, and has such X-ray diffracted intensity $R_{(202)}$ of the (202) face as to be maximum as compared with those of other faces.

The Bi or Bi alloy having such crystal orientation showed a fine rugged sliding surface 6 on which projections 7 in the form of a triangular pyramid or a quadrangular pyramid congregate, as is shown in FIG. 3 that is an enlarged view of a part III in FIG. 2. It is thought that such fine rugged surface easily retains oil thereon, thereby improves its oil wettability and improves its anti-seizure property.

In view of the above, in order to provide a coating layer superior in anti-seizure property as well as fatigue resistance, the present invention includes a further feature that Bi or a Bi alloy of the coating layer has a crystal form in which a Miller index (202) face has the index of orientation of not less than 30% and the X-ray diffracted intensity $R_{(202)}$ of the (202) face assumes a maximum value as compared with those of other faces.

Here, an explanation is given as to the index of orientation. First, since Bi is composed of a trigonal crystal, its Miller index is represented in three digits (h, k, l). Bi or a Bi alloy in the invention shows an orientation between a complete random orientation as in fine powder and a particular one orientation as in a single crystal, and a Miller index (202) face aligns in one direction at a high rate among respective crystal faces of Bi. A rate, at which such particular crystal face aligns in one direction, is denoted by the index of orientation.

The index of orientation Ae of a particular face is defined by $$Ae = R_{(h, k, l)} \times 100 / \Sigma R_{(h, k, l)}$$

where $R_{(h, k, l)}$ indicates the X-ray diffracted intensity of respective faces of a crystal of Bi or its alloy in a coating layer.

$R_{(h, k, l)}$ of a numerator in the above formula indicates the X-ray diffracted intensity of a face of which an index of orientation is to be found, and $\Sigma R_{(h, k, l)}$ indicates the sum total of the X-ray diffracted intensities of respective faces.

In the present invention, in order to provide a further superior anti-seizure property, the Miller index (202) face can have the index of orientation of not less than 40% and the X-ray diffracted intensity $R_{(012)}$ of a Miller index (012) face can be not more than 45% of the X-ray diffracted intensity $R_{(202)}$ of the (202) face.

EXAMPLE

An example of the present invention will be described below. A bimetal was prepared by lining a Cu-based bearing alloy layer on a back steel, and was formed into a half-cylindrical or cylindrical shape. Then, the surface of the bearing alloy layer was finished with a boring process. Subsequently, the surface of the half-cylindrical or cylindrical material was electrolytically degreased and was pickled.

Then, they were sequentially processed with Ag plating steps 1 to 3 shown in the following Table 1, and a Bi plating step shown in Table 2, so that an intermediate layer of single element metal Ag and a coating layer of single element metal Bi were formed and examples 1 to 3, 5 and 7 shown in Table 6 were prepared. In the example 7, a Bi-1 Cu coating layer was formed by using a plating solution consisting of components in Table 2 with 0.5 to 5 g/l of basic copper carbonate added. A comparative example 9 shown in Table 6 was prepared by carrying out the Ag plating steps 1 to 3 in Table 1, and carrying out a normal Bi plating step.

Co plating steps 1 to 3 shown in the following Table 3 and a Bi plating step shown in Table 2 were sequentially carrying out so that an intermediate layer of single element metal Co and a coating layer of single element metal Bi were formed and an example 4 shown in Table 6 was prepared. Furthermore, Cu plating steps 1 to 3 shown in the following Table 4 and a Bi plating step shown in Table 2 were carried out so that an intermediate layer of single element metal Cu and a coating layer of single element metal Bi were formed and an example 6 shown in Table 6 was prepared. A comparative example 8 shown in Table 6 was prepared by carrying out a Ni plating step in the following Table 5, and carrying out a Bi plating step in Table 2. The example 7 has the coating layer made of an alloy of Bi and Cu, and the comparative example 8 has the coating layer made of an alloy of Bi and Sn. Figures marked in front of Cu or Sn mean contents (mass %) thereof.

TABLE 1

| | Composition of plating solution and step condition in each Ag plating step | | |
|---|---|---|---|
| plating condition | Ag plating step 1 | Ag plating step 2 | Ag plating step 3 |
| cathodic current density (A/dm$^2$) | 0.5~1 | 1.5~3 | 0.5~2 decreasing cathodic current density at rate of 0.2 to 0.7 A/(dm$^2$ · minute) during plating step |

TABLE 1-continued

Composition of plating solution and step condition in each Ag plating step

| plating condition | Ag plating step 1 | Ag plating step 2 | Ag plating step 3 |
|---|---|---|---|
| plating bath temperature (° C.) | 20~30 | 20~30 | 40~50 |
| composition of plating solution | | | |
| silver cyanide (g/l) | 1~5 | 30~60 | |
| sodium cyanide (g/l) | 50~120 | 100~200 | |
| sodium carbonate (g/l) | 3~10 | 10~30 | |
| Dain silver AGM-15 | | | 70~200 |
| Dain silver AGI | | | 330~500 |
| Dain silver AGH | | | 25~50 |

TABLE 2

Composition of plating solution and step condition in Bi plating step

| Plating condition | Bi plating step 1 |
|---|---|
| current density (A/dm$^2$) | 1~6 |
| plating bath temperature (° C.) | 25~40 |
| composition of plating solution | |
| bismuth oxide (g/l) | 10~70 |
| methanesulfonic acid (ml/l) | 30~150 |
| HS-220S (ml/l) | 20~60 |
| others | A PR electrolytic method is employed. An ultra vibration is employed. Stirring due to the flow of a plating solution is moderated. |

TABLE 3

Composition of plating solution and step condition in each Co plating step

| plating condition | Co plating step 1 | Co plating step 2 | Co plating step 3 |
|---|---|---|---|
| cathodic current density (A/dm$^2$) | 0.5~2 | 3~8 | 1~5 decreasing cathodic current density at rate of 0.2 to 0.7 A/(dm$^2$·minute) during plating step |
| plating bath temperature (° C.) | 40~60 | 40~60 | 40~60 |
| composition of plating solution | | | |
| cobalt sulfate (g/l) | 15~50 | 270~400 | |

TABLE 3-continued

Composition of plating solution and step condition in each Co plating step

| plating condition | Co plating step 1 | Co plating step 2 | Co plating step 3 |
|---|---|---|---|
| cobalt chloride (g/l) | | | 210~300 |
| boric acid (g/l) | 5~15 | 25~60 | 20~60 |

TABLE 4

Composition of plating solution and step condition in each Cu plating step

| plating condition | Cu plating step 1 | Cu plating step 2 | Cu plating step 3 |
|---|---|---|---|
| cathodic current density (A/dm$^2$) | 0.5~1 | 1~4 | 2~5 decreasing cathodic current density at rate of 0.2 to 0.7 A/(dm$^2$·minute) during plating step |
| plating bath temperature (° C.) | 40~60 | 40~60 | 20~50 |
| composition of plating solution | | | |
| copper cyanide (g/l) | 1~5 | 30~60 | |
| sodium cyanide (g/l) | 2~7 | 7~20 | |
| sodium carbonate (g/l) | 5~30 | 30~100 | |
| rochelle salt (g/l) | 5~30 | 30~100 | |
| copper sulfate (g/l) | | | 200~300 |
| concentrate sulfuric acid (g/l) | | | 70~120 |

TABLE 5

Composition of plating solution and step condition in Ni plating step

| plating condition | |
|---|---|
| cathodic Current density (A/dm$^2$) | 1~8 |
| plating bath temperature (° C.) | 40~60 |
| composition of plating solution | |
| nickel sulfate (g/l) | 270~400 |
| nickel chloride (g/l) | 45~80 |
| boric acid (g/l) | 25~60 |

TABLE 6

| | | intermediate layer | | | coating layer | | | | | bearing characteristics | |
| --- | --- | --- | --- | --- | --- | --- | --- | --- | --- | --- | --- |
| | | material | D/d | layer thickness (μm) | material | aspect ratio | growth direction (degree) of columnar grain | layer thickness (μm) | index (%) of orientation of (202) face | $\frac{R(012)}{R(202)} \times 100$ (%) | maximum surface pressure (MPa) of not causing fatigue | maximum surface pressure (MPa) of not causing seizure |
| Example | 1 | Ag | 3.5 | 5 | Bi | 5 | 5 | 5 | 68 | 8 | 100 | 80 |
| | 2 | Ag | 4 | 13 | Bi | 2 | 8 | 2 | 28 | 47 | 90 | 65 |
| | 3 | Ag | 3 | 9 | Bi | 4 | 5 | 4 | 35 | 26 | 100 | 70 |
| | 4 | Co | 2 | 3 | Bi | 5 | 11 | 7 | 21 | 54 | 90 | 65 |
| | 5 | Ag | 1.5 | 1 | Bi | 11 | 8 | 19 | 58 | 12 | 80 | 75 |
| | 6 | Cu | 2.5 | 7 | Bi | 2 | 13 | 3 | 38 | 50 | 85 | 70 |
| | 7 | Ag | 3 | 5 | Bi—1Cu | 3 | 25 | 4 | 65 | 15 | 80 | 70 |
| comparative example | 8 | Ni | 1 | 5 | Bi—3Sn | 2 | 15 | 6 | 28 | 55 | 50 | 55 |
| | 9 | Ag | 0.5 | 5 | Bi | 0.5 | — | 5 | 23 | 60 | 55 | 50 |

In Ag plating steps 2 and 3, Co plating steps 2 and 3 and Cu plating steps 2 and 3, a deposition rate of Ag, Co and Cu is slowly decreased by decreasing a cathodic current density at a constant rate during the plating steps to promote crystal growth. The plating deposition rates in the Ag plating step 3, the Co plating step 3 and the Cu plating step 3 are lower than those in the Ag plating step 2, the Co plating step 2 and the Cu plating step 2, which can grow a larger crystal.

In Bi plating step in examples 1 to 7, the layer of Bi or a Bi alloy is formed according to conditions in Table 1 using a PR electrolytic method (Period Reverse Electroplating) to obtain not less than 30% (202) faces by an index of orientation. At this time, a vibration (ultra vibration) between 20 and 40 Hz is given to the plating solution and thereby a deposition rate during plating is increased, so that the layer of Bi or the Bi alloy can obtain a metallographic structure having columnar grains. In addition, stirring due to a flow of the plating solution is moderated, so that the growth of the columnar grain can be further promoted.

On the other hand, a comparative example 9 prepared through a normal Bi plating step (using no PR electrolytic method and normally stirring a plating solution without giving ultra vibration) has a Bi coating layer without the columnar grain.

The above PR electrolytic method is the one which periodically switches a cathodic current to an anodic current, so that the period of the anodic current can be generally 10 to 20% with respect to the period of the cathodic current. The longer is the period of the anodic current, the smoother is a plated surface, but the slower is a plating speed. The index of orientation can be changed by adjusting the anodic current, the cathodic current, and a switching cycle thereof.

Examples 1 to 7 and comparative examples 8 and 9 obtained in the above described method were subjected to the measurement of an average grain diameter "d" of the intermediate layer in the base material side (in the vicinity of the interface with the base material, see a line CL1) and an average grain diameter "D" of that in the coating layer side (in the vicinity of the interface with the coating layer, see a line CL2), and the ratio D/d was calculated. The results are shown in Table 6. They were also subjected to the measurement of the thickness of the intermediate layer. The results are shown in Table 6.

The growth direction of a columnar grain in the coating layer was measured by an angle formed with respect to the thickness direction of the coating layer, and the average aspect ratio of the columnar grain was determined. The results are shown in Table 6. The thickness of the coating layer and the index of orientation of a (202) face in the coating layer were also measured. Then, it was confirmed that the X-ray diffracted intensity $R_{(202)}$ of the (202) face shows a maximum value as compared with those of other faces, and besides the X-ray diffracted intensity $R_{(012)}$ of the (012) face was measured, and a ratio of the X-ray diffracted intensity $R_{(012)}$ of the (012) face to the X-ray diffracted intensity $R_{(202)}$ of the (202) face was calculated. The results are shown in Table 6.

The examples 1 to 7 and the comparative examples 8 and 9 were also subjected to a fatigue test and a seizure test in conditions shown in the following Tables 7 and 8, and the results are shown in Table 6.

TABLE 7

| Condition of fatigue test | |
| --- | --- |
| inner diameter of bearing | 50 mm |
| width of bearing | 16 mm |
| revolution | 4800 rpm |
| lubricant oil | VG22 |
| shaft material | S55C |
| time of test | 15 hours |

TABLE 8

| Condition of seizure test | |
| --- | --- |
| inner diameter of bearing | 53 mm |
| width of bearing | 16 mm |
| circumferential speed | 10 m/s |
| lubricant oil | VG22 |
| quantity of fed oil | 50 ml/minute |
| shaft material | S55C |
| test load | increase of 5 MPa every 10 minutes |

As is understood from Table 6, examples 1 to 7 have a more excellent anti-seizure property as well as fatigue resistance than comparative examples 8 and 9.

A ratio D/d of the comparative example 8 is 1, which means that a grain in an intermediate layer does not grow incrementally larger toward a coating layer. The coating layer of the comparative example 8 also tends to easily break away, which means that it does not have sufficient bonding strength to the intermediate layer, because Ni (nickel) of the intermediate layer forms a fragile intermetallic compound with Bi or Sn in the coating layer. As a result, the comparative example 8 has lowered fatigue resistance. Furthermore, it tends to cause fatigue, because a phase of a Bi—Sn alloy with remarkably low melting point of 139° C. is formed in the coating layer, and partially reduces the mechanical strength of the coating layer.

A comparative example 9 shows a low value of D/d, by which the grain becomes smaller toward the coating layer side from the bearing alloy layer side in the intermediate layer. As a result, the diameter of the grain in the intermediate layer does not match with that of the bearing alloy layer or that of the coating layer, so that the intermediate layer has low bonding strength to the base material or to the coating layer. In addition, in the comparative example 9, the coating layer does not have a grown columnar grain therein, and cannot bear a load in a major axis direction of the columnar grain. For this reason, the comparative example 9 shows low fatigue resistance.

In contrast to this, in examples 1 to 7, an intermediate layer is formed of Ag, Co or Cu which does not produce an intermetallic compound with Bi and Cu, so that the coating layer is strongly bonded to the intermediate layer, and hardly breaks away from the intermediate layer. In addition, the coating layer is composed of a grown columnar grain and can bear a load in a major axis direction of the grain. For this reason, the examples 1 to 7 present adequate fatigue resistance.

In examples 1 to 7, the bonding strength of an overlay is also improved and the grain in the coating layer is controlled to improve fatigue resistance. Consequently they can slide extremely stably even in a high-revolution engine, and show an improved anti-seizure property. Among the examples 1 to 7, the examples 1, 3 and 5 to 7 having a Miller index (202) face in an amount of not less than 30% by an index of orientation easily retain oil and show improved conformability and accordingly a higher anti-seizure property, in comparison with the examples 2 and 4 having the (202) face in an amount of less than 30%.

The present invention is not limited to the above described embodiment shown in the drawings. It can be expanded or changed as is described below.

It is acceptable that an intermediate layer and a coating layer contain Pb in the extent of unavoidably contained impurities.

The present invention can be widely applied to a sliding member without being limited to a plain bearing of an automotive engine.

The invention claimed is:

1. A sliding member comprising:
   a base material;
   an intermediate layer on the base material, the intermediate layer being formed of a lead-free metal; and
   a coating layer on the intermediate layer, the coating layer being formed of Bi or a lead-free Bi alloy,
   wherein a grain in the intermediate layer becomes gradually large toward a coating layer side from a base material side, and a grain in the coating layer forms a columnar grain which is elongated along a thickness direction of the coating layer.

2. The sliding member according to claim 1, wherein the grain in the intermediate layer in the vicinity of an interface between the intermediate layer and the coating layer has a diameter in a imaginary plane parallel to the sliding surface being not less than twice by average than that in the intermediate layer in the vicinity of an interface between the intermediate layer and the base material.

3. The sliding member according to claim 2, wherein the grain in the coating layer forms a columnar grain having an angle of not more than 20 degrees by average between a growth direction of the grain and a thickness direction of the coating layer, and having an aspect ratio of a major axis to a minor axis of the grain of not less than 2 but not more than 10.

4. The sliding member according to claim 2 wherein the intermediate layer is formed of a single element metal, and the coating layer is formed of a single element metal of Bi.

5. The sliding member according to claim 2, wherein a matrix metal of the base material and a matrix metal of the intermediate layer have the same crystal structure.

6. The sliding member according to claim 2, wherein the intermediate layer has a thickness of 1 to 10 μm and the coating layer has a thickness of 2 to 15 μm.

7. The sliding member according to claim 1, wherein the grain in the coating layer forms a columnar grain having an angle of not more than 20 degrees by average between a growth direction of the grain and a thickness direction of the coating layer, and having an aspect ratio of a major axis to a minor axis of the grain of not less than 2 but not more than 10.

8. The sliding member according to claim 3, wherein the intermediate layer is formed of a single element metal, and the coating layer is formed of a single element metal of Bi.

9. The sliding member according to claim 3, wherein the intermediate layer has a thickness of 1 to 10 μm and the coating layer has a thickness of 2 to 15 μm.

10. The sliding member according to claim 3, wherein Bi or a Bi alloy of the coating layer has such crystal orientation that a Miller index (202) face has an index of orientation of not less than 30% and the X-ray diffracted intensity $R_{(202)}$ of the (202) face assumes a maximum value as compared with those of other faces.

11. The sliding member according to claim 1, wherein the intermediate layer is formed of a single element metal, and the coating layer is formed of a single element metal of Bi.

12. The sliding member according to claim 4, wherein a matrix metal of the base material and a matrix metal of the intermediate layer have the same crystal structure.

13. The sliding member according to claim 4, wherein the intermediate layer is formed of a single element metal of Ag, Cu or Co.

14. The sliding member according to claim 1, wherein a matrix metal of the base material and a matrix metal of the intermediate layer have the same crystal structure.

15. The sliding member according to claim 5, wherein the intermediate layer is formed of a single element metal of Ag, Cu or Co.

16. The sliding member according to claim 1, wherein the intermediate layer is formed of a single element metal of Ag, Cu or Co.

17. The sliding member according to claim 1, wherein the intermediate layer has a thickness of 1 to 10 μm and the coating layer has a thickness of 2 to 15 μm.

18. The sliding member according to claim 1, wherein Bi or a Bi alloy of the coating layer has such crystal orientation that a Miller index (202) face has an index of orientation of not less than 30% and the X-ray diffracted intensity $R_{(202)}$ of the (202) face assumes a maximum value as compared with those of other faces.

19. The sliding member according to claim 18, wherein the Miller index (202) face has the index of orientation of not less than 40% and the X-ray diffracted intensity $R_{(012)}$ of a Miller index (012) face is not more than 45% of the X-ray diffracted intensity $R_{(202)}$ of the (202) face.

20. The sliding member according to claim 1, wherein the Miller index (202) face has the index of orientation of not less than 40% and the X-ray diffracted intensity $R_{(012)}$ of a Miller index (012) face is not more than 45% of the X-ray diffracted intensity $R_{(202)}$ of the (202) face.

* * * * *

UNITED STATES PATENT AND TRADEMARK OFFICE
CERTIFICATE OF CORRECTION

PATENT NO.       : 7,629,058 B2                          Page 1 of 1
APPLICATION NO. : 11/386617
DATED            : December 8, 2009
INVENTOR(S)      : Takayanagi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 930 days.

Signed and Sealed this

Second Day of November, 2010

David J. Kappos
*Director of the United States Patent and Trademark Office*